United States Patent
Fang et al.

(10) Patent No.: US 8,965,051 B2
(45) Date of Patent: Feb. 24, 2015

(54) METHOD AND APPARATUS FOR PROVIDING HAND DETECTION

(75) Inventors: Yikai Fang, Beijing (CN); Lei Xu, Beijing (CN); Kongqiao Wang, Beijing (CN)

(73) Assignee: Nokia Corporation, Espoo (FI)

( * ) Notice: Subject to any disclaimer, the term of this patent is extended or adjusted under 35 U.S.C. 154(b) by 126 days.

(21) Appl. No.: 13/877,775

(22) PCT Filed: Oct. 18, 2010

(86) PCT No.: PCT/CN2010/077815
§ 371 (c)(1),
(2), (4) Date: Apr. 4, 2013

(87) PCT Pub. No.: WO2012/051747
PCT Pub. Date: Apr. 26, 2012

(65) Prior Publication Data
US 2013/0188836 A1    Jul. 25, 2013

(51) Int. Cl.
*G06K 9/00* (2006.01)
(52) U.S. Cl.
CPC ........ *G06K 9/00335* (2013.01); *G06K 9/00355* (2013.01)
USPC .......................................... 382/103; 715/863
(58) Field of Classification Search
USPC .......................................... 382/103; 715/863
See application file for complete search history.

(56) References Cited

U.S. PATENT DOCUMENTS

| 5,150,426 A | 9/1992 | Banh et al. |
|---|---|---|
| 6,944,315 B1 * | 9/2005 | Zipperer et al. ............. 382/103 |
| 8,194,921 B2 | 6/2012 | Kongqiao et al. |
| 8,253,746 B2 * | 8/2012 | Geisner et al. ............... 345/474 |
| 8,325,978 B2 | 12/2012 | Chai et al. |
| 2008/0244465 A1 | 10/2008 | Kongqiao et al. |
| 2011/0074675 A1 | 3/2011 | Shiming et al. |

FOREIGN PATENT DOCUMENTS

| CN | 101567043 A | 10/2009 |
|---|---|---|
| KR | 20070103895 A | 10/2007 |

OTHER PUBLICATIONS

Mathias Kolsch and Matthew Turk, "Fast 2D Hand Tracking with Flocks of Features and Multi-Cue Integration" Retrieved from Internet on Oct. 7, 2014 from URL>http://ieeexplore.ieee.org/stamp/stamp.jsp?tp=&arnumber=1384956>. Jun. 2004.*

Ashwin Thangali and Stan Sclaroff, "An alignment based similarity measure for hand detection in cluttered sign language video", Boston University, Computer Science technical report BUCS-TR-2009-009, Retrieved from Internet on Oct. 7, 2014 from URL:<http://ieeexplore.ieee.org/stamp/stamp.jsp?tp=&arnumber=5204266>. 2009.*

(Continued)

*Primary Examiner* — Gregory F Cunningham
(74) *Attorney, Agent, or Firm* — Nokia Corporation (57) ABSTRACT

A method for providing hand detection may include receiving feature transformed image data for a series of image frames, determining asymmetric difference data indicative of differences between feature transformed image data of a plurality of frames of the series of image frames and a reference frame, and determining a target area based on an intersection of the asymmetric difference data. An apparatus and computer program product corresponding to the method are also provided.

20 Claims, 7 Drawing Sheets

(56) References Cited

OTHER PUBLICATIONS

Maren Bennewitz, Tobias Axenbeck, Sven Behnke†, and Wolfram Burgard, "Robust Recognition of Complex Gestures for Natural Human-Robot Interaction", Retrieved from Internet on Oct. 7, 2014 from URL:<www.ais.uni-bonn.de/papers/RSS_2008_WS_IRL.pdf>. 2008.*

"Gesture Recognition Technology", Eyesight, Retrieved on Jul. 14, 2014, Webpage available at : http://eyesight-tech.com/.

"GestureTek Labs: Patent and Technology Licensing Program", Gesturetek, Retrieved on Jul. 14, 2014, Webpage available at : http://www.gesturetek.com/products/technologyandlicensing.php.

"Funny Videos, Funny Clips & Funny Pictures", http://www.break.com, Retrieved on Jul. 14, 2014, Webpage available at : http://www.break.com.

Ong et al., "A Boosted Classifier Tree for Hand Shape Detection", Proceedings of 6th International Conference on Automatic Face and Gesture Recognition, May 17-19, 2004, 6 pages.

Kolsch et al., "Robust Hand Detection", Proceedings of 6th International Conference on Automatic Face and Gesture Recognition, May 17-19, 2004, pp. 1-6.

Lee et al., "Hand Region Extraction and Gesture Recognition from Video Stream with Complex Background through Entropy Analysis", Proceedings of the 26th Annual International Conference of the IEEE EMBS, Sep. 1-5, 2004, pp. 1513-1516.

Niu et al., "A Moving Objects Detection Algorithm Based on Improved Background Subtraction", Eighth International Conference on Intelligent Systems Design and Applications, vol. 3, Nov. 26-28, 2008, pp. 604-607.

Chaohui et al., "An Improved Moving Object Detection Algorithm Based on Frame Difference and Edge Detection", Fourth International Conference on Image and Graphics, Aug. 22-24, 2007, pp. 519-523.

Office action received for corresponding Korean Patent Application No. 2013-7012660, dated May 27, 2014, 3 pages of office action and No English translation available.

International Search Report and Written Opinion received for corresponding Patent Cooperation Treaty Application No. PCT/CN2010/077815, dated Aug. 11, 2011, 10 pages.

* cited by examiner

ND APPARATUS FOR
PROVIDING HAND DETECTION

TECHNOLOGICAL FIELD

Embodiments of the present invention relate generally to user interface technology and, more particularly, relate to a method and apparatus for providing hand detection, for example, for gesture analysis for visual interaction systems.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to simplifying human to machine interfaces for HCI (human-computer interaction). With recent developments in the area of the computing devices and hand-held or mobile devices improving the capabilities of such devices, next generation HCI is on the minds of many. Furthermore, given that the devices will tend to increase in their capacity to process content, create content, store content and/or receive content relatively quickly upon request, and given also that mobile electronic devices such as mobile phones often face limitations in display size, text input speed, and physical embodiments of user interfaces (UI), challenges are often created in the context of HCI.

Furthermore, improvements in HCI may also enhance user enjoyment and open possibilities for user interface with computing devices in environments that may otherwise have presented changes for effective HCI. One such improvement relates to gesture recognition. Compared with other interactive mechanisms currently employed in HCI such as, for example, keypad and mouse, some may consider gesture recognition to improve the naturalness and facility of communication. As such, certain applications have been developed to enable gesture recognition for use as a command controller in digital home appliances, for use in file/web navigation or for use as a substitute for the commonly used remote controller. However, current mechanisms for gesture analysis are often slow or cumbersome to employ. Given the general utility of next generation HCI, improvements in gesture analysis may be desirable.

BRIEF SUMMARY OF SOME EXAMPLES

A method, apparatus and computer program product are therefore provided to enable the use of hand detection for a vision based user interface. In some cases, a series of image frames may be analyzed with respect to asymmetric differences between feature transformed versions of the image frames. The asymmetric differences may form the basis for determining a target area in which a hand or other moving object may be detected.

In one example embodiment, a method of providing hand detection is provided. The method may include receiving feature transformed image data for a series of image frames, determining asymmetric difference data indicative of differences between feature transformed image data of a plurality of frames of the series of image frames and a reference frame, and determining a target area based on an intersection of the asymmetric difference data.

In another example embodiment, an apparatus for providing hand detection is provided. The apparatus may include at least one processor and at least one memory including computer program code. The at least one memory and the computer program code may be configured to, with the at least one processor, cause the apparatus to perform at least receiving feature transformed image data for a series of image frames, determining asymmetric difference data indicative of differences between feature transformed image data of a plurality of frames of the series of image frames and a reference frame, and determining a target area based on an intersection of the asymmetric difference data.

In one example embodiment, another apparatus for providing hand detection is provided. The apparatus may include means for receiving feature transformed image data for a series of image frames, means for determining asymmetric difference data indicative of differences between feature transformed image data of a plurality of frames of the series of image frames and a reference frame, and means for determining a target area based on an intersection of the asymmetric difference data.

In one example embodiment, a computer program product for providing hand detection is provided. The computer program product may include at least one computer-readable storage medium having computer-executable program code instructions stored therein. The computer-executable program code instructions may include program code instructions for receiving feature transformed image data for a series of image frames, determining asymmetric difference data indicative of differences between feature transformed image data of a plurality of frames of the series of image frames and a reference frame, and determining a target area based on an intersection of the asymmetric difference data.

Embodiments of the invention may provide a method, apparatus and computer program product for employment, for example, in mobile or fixed environments. As a result, for example, computing device users may enjoy an improved capability for interaction with their respective computing devices.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION OF SOME EMBODIMENTS OF THE INVENTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, some embodiments of the present invention may relate to the provision of a mechanism by which improvements may be experienced in relation to vision based user interface such as by gesture analysis. Hand detection and/or localization may be a useful subject within the greater topic of vision based user interface. However, since the hand provides for relatively large articulated shape variation with relatively fewer texture characteristics than some other detection methods (e.g., face detection methods), hand detection may sometimes be difficult to accomplish. The hand may also present a relatively large illumination variation, which may make color based detection methods relatively unstable, thereby further complicating the use of hand detection in vision based user interface development.

Some embodiments of the present invention may provide a relatively robust mechanism by which substantially real-time hand detection and/or localization may be accomplished for gesture analysis on a video stream of incoming data. As such, relatively simple and computationally efficient gesture analysis may be performed even on devices with limited computing resources. Thus, for example, use of one or more fingers, or the entire hand may be used for interaction with a mobile device user interface in combination with other devices. As an example, a television set may present data on its screen and be in communication with a camera phone (or simply a camera). The camera phone may be focused on the screen of the television and enable interaction by a user presenting hand gestures within the field of view of the camera phone based on the hand gestures recognized in a "plug and touch" interaction environment.

Figure 1:
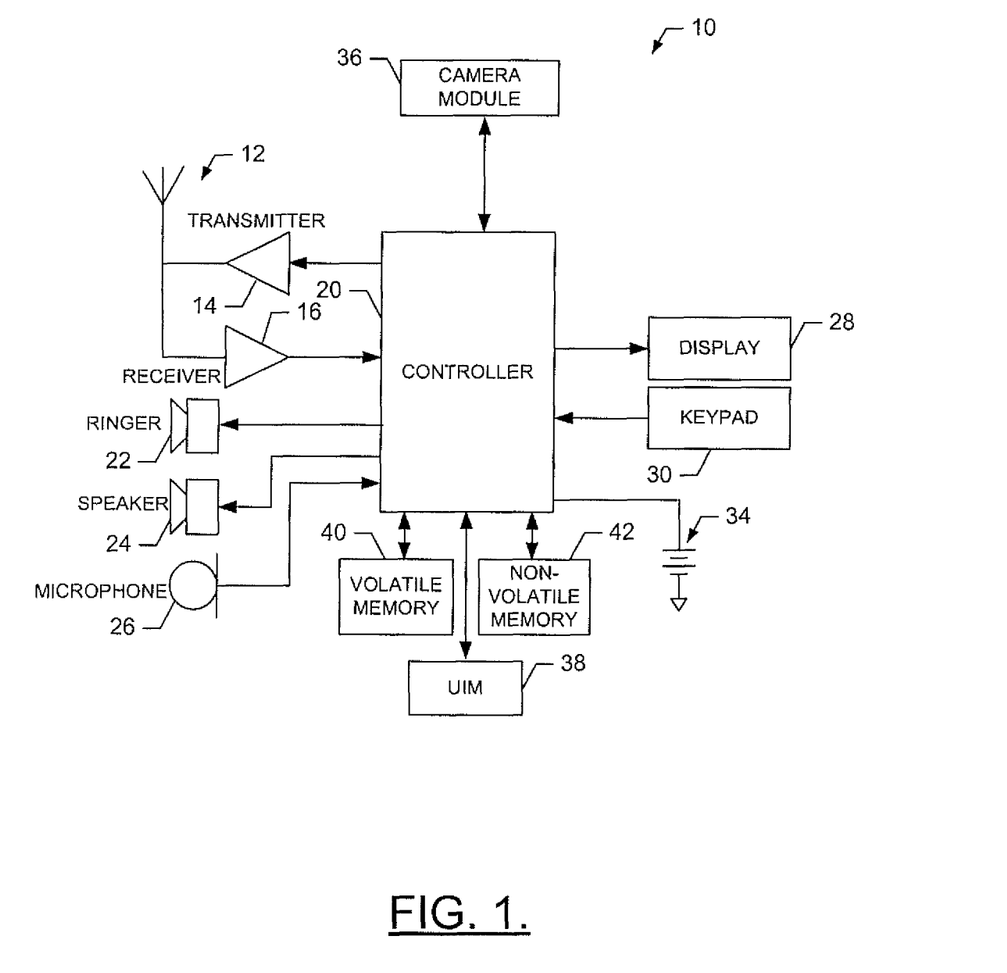
FIG. 1 illustrates a block diagram of a mobile terminal that may employ an example embodiment of the present invention.

FIG. 1, one example embodiment of the invention, illustrates a block diagram of a mobile terminal 10 that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, may readily employ embodiments of the present invention. Even fixed devices may employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing hardware, that controls the provision of signals to and the reception of signals from the transmitter 14 and receiver 16, respectively. The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may include circuitry implementing, among others, audio and logic functions of the mobile terminal 10. For example, the controller 20 may comprise a digital signal processor device, a microprocessor device, and various analog to digital converters, digital to analog converters, and/or other hardware support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown), a microphone or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

In some embodiments, the mobile terminal 10 includes a media capturing element, such as a camera, video and/or audio module, in communication with the controller 20. The media capturing element may be any means for capturing an image, video and/or audio for storage, display or transmission. For example, in an example embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an example embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format or another like format. In some cases, the camera module 36 may provide live image data to the display 28. Moreover, in an example embodiment, the display 28 may be located on one side of the mobile terminal 10 and the camera module 36 may include a lens positioned on the opposite side of the mobile terminal 10 with respect to the display 28 to enable the camera module 36 to capture images on one side of the mobile terminal 10 and present a view of such images to the user positioned on the other side of the mobile terminal 10.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10.

Figure 2:
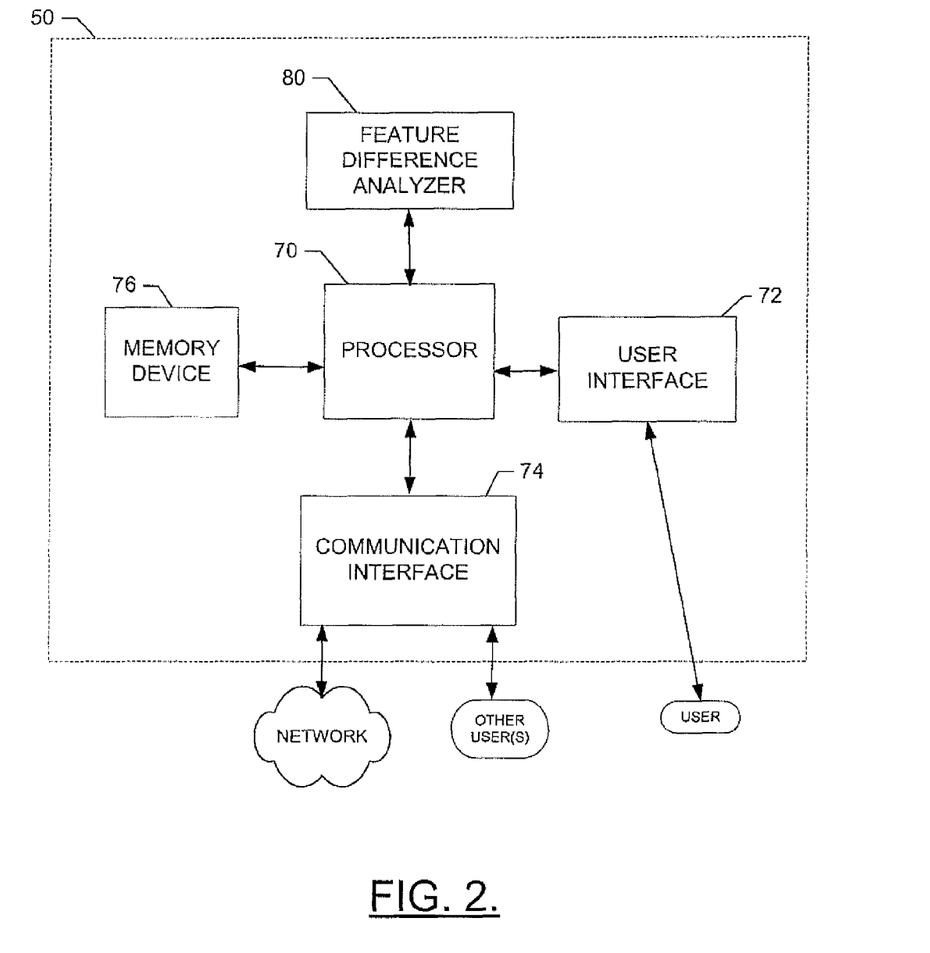
FIG. 2 illustrates a block diagram of an apparatus for providing hand detection according to an example embodiment of the present invention.

FIG. 2 illustrates a schematic block diagram of an apparatus for providing hand detection according to an example embodiment of the present invention. An example embodiment of the invention will now be described with reference to FIG. 2, in which certain elements of an apparatus 50 for providing hand detection are displayed. The apparatus 50 of FIG. 2 may be employed, for example, on the mobile terminal 10. However, the apparatus 50 may alternatively be embodied at a variety of other devices, both mobile and fixed. In some cases, an embodiment may be employed on either one or a combination of devices. Accordingly, some embodiments of the present invention may be embodied wholly at a single device (e.g., the mobile terminal 10), by a plurality of devices in a distributed fashion or by devices in a client/server relationship. Furthermore, it should be noted that the devices or elements described below may not be mandatory and thus some may be omitted in certain embodiments.

Referring now to FIG. 2, an apparatus for providing hand detection is provided. The apparatus 50 may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a vector processor, a graphics processing unit (GPU), a special-purpose computer chip, or other similar hardware processors. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal, a fixed terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, or a combination of hardware and software, that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus 50 is embodied as a server or some other network devices, the user interface 72 may be limited, or eliminated. However, in an embodiment in which the apparatus is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the processor 70 may be embodied as, include or otherwise control a feature difference analyzer 80. As such, in some embodiments, the processor 70 may be said to cause, direct or control the execution or occurrence of the various functions attributed to the feature difference analyzer 80 as described herein. The feature difference analyzer 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the feature difference analyzer 80 as described herein, Thus, in examples in which software is employed, a device or circuitry (e.g., the processor 70 in one example) executing the software forms the structure associated with such means.

In an example embodiment, the feature difference analyzer 80 may generally be configured to perform any or all of series of operations that may in some cases include generating a feature transformed image, determining asymmetric differences between the frames, performing rebinarization with respect to the asymmetric differences and refining the target area based on the intersection between the asymmetric differences. In some embodiments, rather than generating the feature transformed image, the feature difference analyzer 80 may receive feature transformed image data that has been transformed by another device or by a separate module of the mobile terminal 10.

Accordingly, for example, the feature difference analyzer 80 may be configured to generate or receive feature transformed image frames. In some embodiments, the image frames may be feature transformed using, for example, a local binary pattern (LBP) texture operator. Thereafter, the image frames may be analyzed to determine the asymmetric differences therebetween. Based on the differences, a refined target area may be progressively determined, As such, in some examples, the transformed feature frames $T_c$ and $\{T_{c-d_i}|d_i \geq 1\}$, may be determined for frames $I_c$ and $\{I_{c-d_i}|d_i \geq 1\}$ at a predetermined interval in a video sequence. As indicated above, the transformation may be LBP and/or a modified census transform (MCT). The transformation may make the differences robust or less susceptible to disturbances such as, for example, illumination variations.

After transformation, asymmetric differences $D_0, D_1, \ldots, D_i, \ldots$ may be determined at intervals $d_i$, where $D_i = T_c - T_{c-d_i}$. The feature difference analyzer 80 may then be configured to rebinarize the frame differences $M_i$ with an adaptive threshold mechanism. Thereafter, the target area (TA) may be refined based on the frame differences according to $$TA = \bigcap_i M_i.$$

In some embodiments, asymmetric frame difference determinations may be used as a mechanism by which to identify areas of an image sequence where movement is occurring. Moreover, the use of asymmetric frame difference determinations may reduce complexity and computational cost to make implementation of the feature difference analyzer 80 more easily attainable on mobile or hand held devices. Asymmetric frame difference determinations may be relatively capable in terms of dealing with direct frame differences, and therefore may not typically be used in connection with real systems. However, in an example embodiment, the frame differences may be feature transformed images and therefore, asymmetric frame differences may work relatively well.

In order to identify the target area (TA), single frame differences such as the difference between a first frame corresponding to $T_{c-d}$ and a second frame corresponding to $T_c$ may not be sufficient. Accordingly, symmetric frame differences may be used to determine the target area (TA) by analyzing several frames. With the symmetric differences determined, the target area (TA) may be obtained as the intersection of binarized frame differences. However, although the target area (TA) could perhaps be determined in previous transformed frame (e.g., $T_{c-d_i}$) instead of in a current frame (e.g., $T_c$) with symmetric differences, such a mechanism may cause a delay of $d_1$ frames in processing and therefore may be less desirable for use in a real-time interactive application. Accordingly, some embodiments of the present invention may build frame differences in the form $T_c - T_{c-d_1}$, $T_c - T_{c-d_2}, \ldots, T_c - T_{c-d_i}, \ldots$, so that the target area (TA) may be obtained for the current frame $T_c$. Processing of symmetric differences may therefore involve the examination of the differences between each consecutive frame (e.g., the difference between the first frame and a second frame, the difference between the second frame and a third frame, the difference between the third frame and a fourth frame, etc.). Meanwhile processing of asymmetric differences may involve the comparison of each respective frame to a common frame (e.g., the difference between a first frame and a second frame, the difference between a third frame and the first frame, the difference between a fourth frame and the first frame, etc.)

Figure 3A:
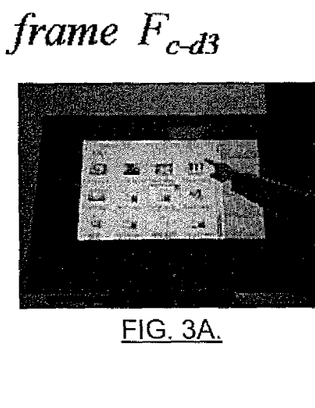
FIG. 3 (including FIGS. 3A through 3L) illustrates an example determination of asymmetric frame differences for identifying a target area according to an example embodiment of the present invention.
Figure 3B:
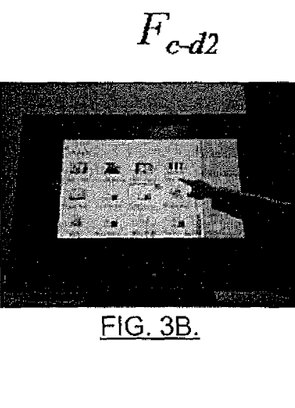
Figure 3C:
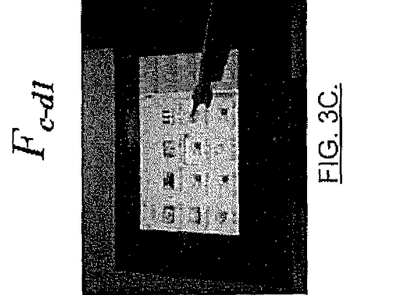
Figure 3D:
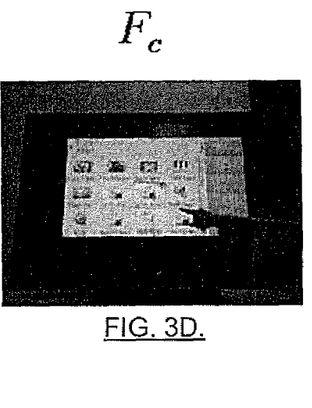
Figure 3E:
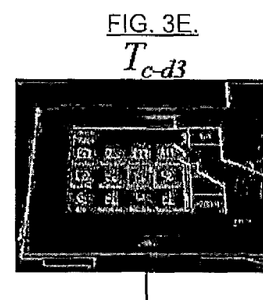
Figure 3F:
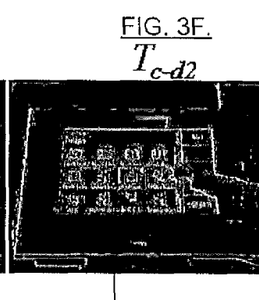
Figure 3G:
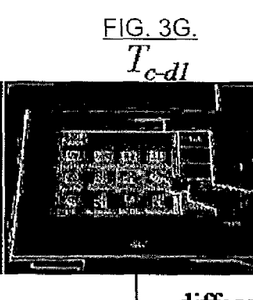
Figure 3H:
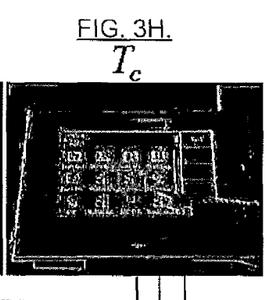
Figure 3I:
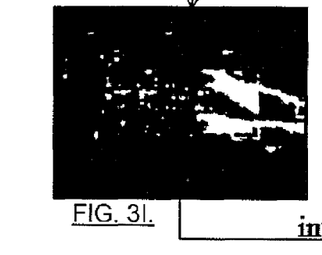
Figure 3J:
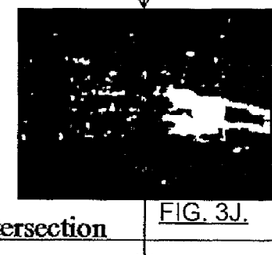
Figure 3K:
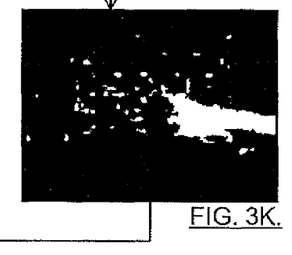
Figure 3L:
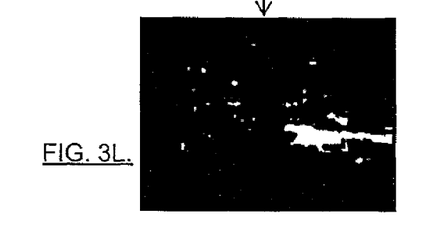

Thus, for example, several frames with an interval d, may be used to determine frame asymmetric differences in a style as $T_c - T_{c-d_1}$, $T_{c-d_1} - T_{c-d_2}, \ldots, T_{c-d_{i-1}} - T_{c-d_i}, \ldots$, where $T_i$ represents LBP transformed frames. FIG. 3, which includes FIGS. 3A to 3L, illustrates an example determination of asymmetric frame differences for identifying a target area. In this regard, FIGS. 3A, 3B, 3C and 3D illustrate a series of frames (e.g., frames $F_{c-d3}$, $F_{c-d2}$, $F_{c-d1}$ and $F_c$) showing a display with various items displayed thereon. As can be seen in FIGS. 3A to 3D, there is a hand pointing toward the display in FIG. 3A and the hand moves somewhat downward in each subsequent frame. FIGS. 3E, 3F, 3G and 3H show feature transformed representations of the image frames shown in FIGS. 3A, 3B, 3C and 3D, respectively (e.g., $T_{c-d3}$, $T_{c-d2}$, $T_{c-d1}$ and $T_c$). The feature difference analyzer 80 may be configured to determine the differences between these feature-transformed representations. Thus, for example, FIG. 3I may represent the difference between $T_{c-d3}$ and $T_c$. In other words, FIG. 3I may represent the difference between the representations of the frames in FIGS. 3E and 3H. FIG. 3J may represent the difference between $T_{c-d2}$ and $T_c$. In other words, FIG. 3J may represent the difference between the representations of the frames in FIGS. 3F and 3H. Meanwhile, FIG. 3K may represent the difference between $T_{c-d1}$ and $T_c$. In other words, FIG. 3K may represent the difference between the representations of the frames in FIGS. 3G and 3H. FIG. 3L then illustrates the intersection of the binarized frame differences. In other words, FIG. 3L illustrates the intersection of the representations shown in FIGS. 3I, 3J and 3K. Thus, the intersection of the difference images of FIGS. 3I, 3J and 3K provides a result giving the position of the hand in the current frame Compared to a determination involving symmetric differences (which would have determined differences between each respective set of adjacent frames and therefore differences between $T_{c-d3}$ and $T_{c-d2}$, $T_{c-d2}$ and $T_{c-d1}$, and $T_{c-d1}$ and $T_c$) the delay provided according to an example as provided in reference to FIG. 3 may be eliminated.

Figure 4:
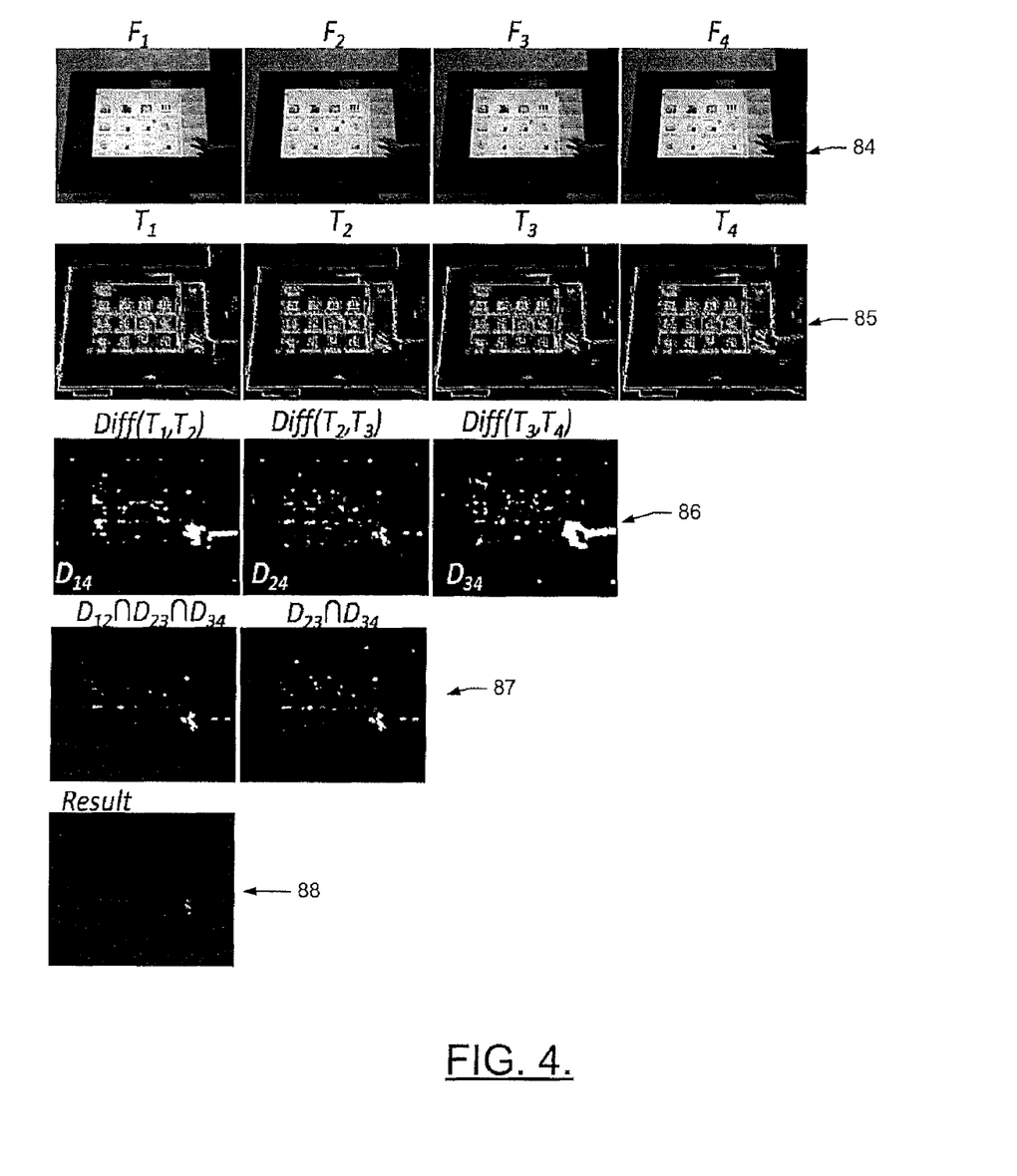
FIG. 4 illustrates a series of images, corresponding transformed image frames, difference representations between each respective frame and a reference frame, the intersection of the difference representations, and a corresponding result according to an example in which a symmetric method is employed.

In some situations, movement of the head, a hand or some other body part, may not be a very fast interaction. Thus, the differences in the positions of such objects in consecutive frames may not be very large. The use of a symmetric method of determining differences between frames may not provide very useful results in such cases since the small changes in subsequent frames may not be detectable. Thus, in addition to creating delay issues, symmetric methods may not be able to detect some interactions due to the small changes in consecutive frames. As an example, FIG. 4 illustrates the use of a symmetric method for determining differences between frames. The first row of images 84 in FIG. 4 illustrates a series of frames. The second row 85 shows feature transformed representations of the first row of images 84. The third row 86 represents the difference between each consecutive frame. As can be seen, the difference is relatively small since the movement of the hand in each of the series of frames of the first row of images 84 was relatively small. Finally, the fourth row 87 illustrates the result of the intersection of the differences and the fifth row 88 shows the final result. Again, the result of the intersection is very small since the movement and therefore change between each subsequent frame is small. The final result is an almost imperceptible tracking area.

Meanwhile, an asymmetric method may detect the area of movement more accurately because, as indicated above, there is a larger temporal span that is accounted for when determining differences asymmetrically (e.g., the differences are not always between adjacent frames, but between a series of frames and a reference frame such as the current frame or most recent frame among the series of frames). Such a difference is shown in relation to FIG. 5.

In implementation, Hamming distance may be used to get binarized frame difference information after LBP transformation. Corresponding codes may therefore be different with respect to the number of bits in a LBP value. To eliminate or at least reduce noise disturbances, if the hamming distance at an ith pixel in a frame difference is not more than 1, the pixel in the difference image may be set to zero. Thus, for example, for pixel p in frame difference image:

$$p = \begin{cases} 1, & \text{if } dist_{ham} > 1 \\ 0, & \text{else.} \end{cases} \quad (1)$$

Thereafter, the asymmetric frame difference binary images may be determined. Frame differences may then be rebinarized. In some embodiments, a local adaptive thresholding mechanism may be employed to rebinarize frame difference images. For an m×m subwindow centered at pixel $p_i$ in a difference image, denoting the non-zero pixels in the subwindow as $n_{none-zero}$, the new value of pixel $p_i$ in difference image may be set as follows:

$$p_i = \begin{cases} 1, & \text{if } n_{non-zero} > m^2/2 \\ 0, & \text{else.} \end{cases} \quad (2)$$

Figure 5:
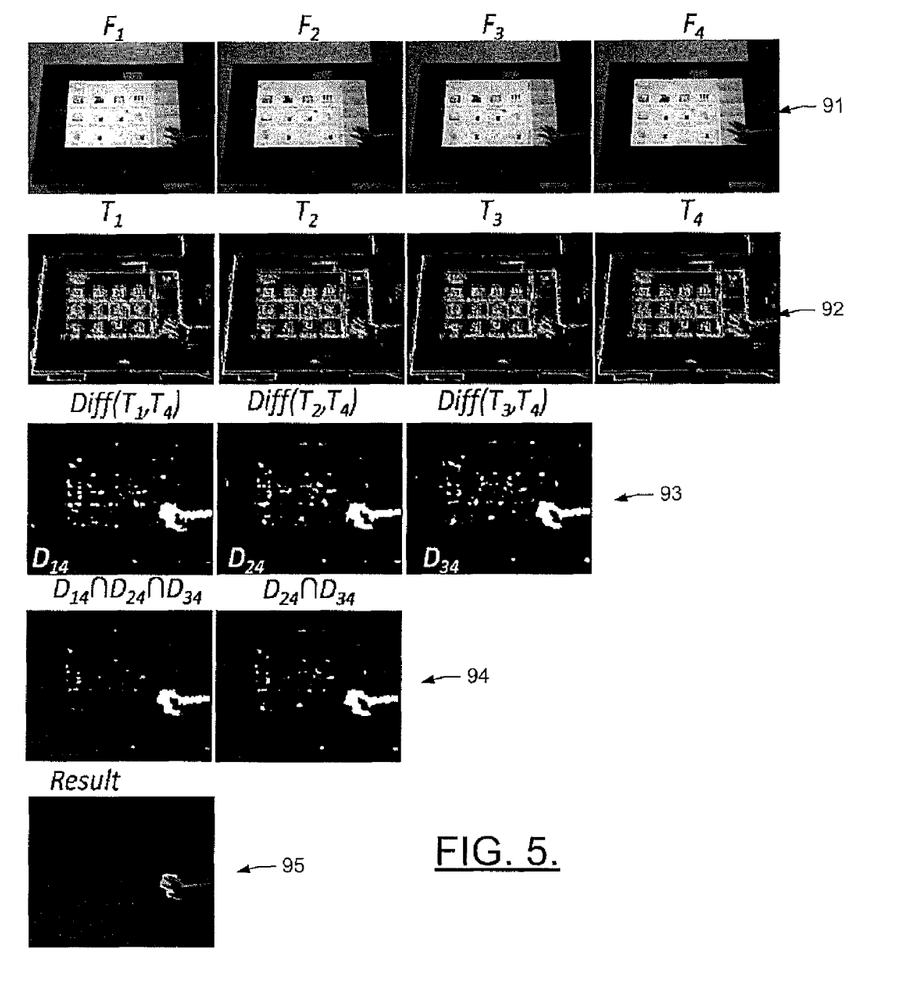
FIG. 5 illustrates, for an asymmetric method, a series of images, corresponding transformed image frames, difference representations between each respective frame and a reference frame, the intersection of the difference representations, and a corresponding result according to an example embodiment of the present invention.

FIG. 5 shows an example series of images (in first row 91), corresponding transformed image frames (in second row 92), difference representations between each respective frame and a reference frame (in this example T4) (in third row 93), the intersection of the difference representations (in fourth row 94), and a corresponding result (in fifth row 95). The rebinarized difference images $M_i$, may be obtained from frame differences $T_c - T_{c-d_1}, T_c - T_{c-d_2}, \ldots, T_c - T_{c-d_i}, \ldots$. The refined target area (TA) may be inferred using the sequence of $M_i$. In this regard, for example, the real target area (TA) may be inferred from the intersection of $M_i$ as $$TA = \bigcap_i M_i.$$

Other postprocess operations, such as filling tiny holes in an image and removing noises, may then be accomplished thereafter. The outcome (labeled "Result" in FIG. 5) provides a relatively clear indication of the target area (TA) in which movement of the hand has occurred and therefore enables the vision system to focus on the corresponding area for gesture detection or other vision based interface operations. In FIGS. 3 and 5, $D_{ij}$=Diff($T_i, T_j$). As can be seen by comparing the result in FIG. 5 to the result in FIG. 4, use of asymmetric differences results in a much clearer indication of the target area since asymmetric differences are more sensitive in situations where small changes are experienced between consecutive frames.

Some embodiments of the present invention may therefore enable hand detection and/or localization for use in real-time interactive applications, even on mobile platforms that do not have relatively unlimited processing resources. Accordingly, moving target detections based on frame differences, which would otherwise be computationally expensive, may be accomplished in a relatively inexpensive manner while still enabling results to be achieved without delay (e.g., the position of a target (hand) in a current frame may be detected immediately without any delay). Some embodiments may also provide for relatively wide range of speed responses (including accounting for minor or slow movement between frames). Some embodiments may also have robust resistance to illumination variations caused by movement of the camera view as the difference values used may be obtained from LBP transformed images.

Figure 6:
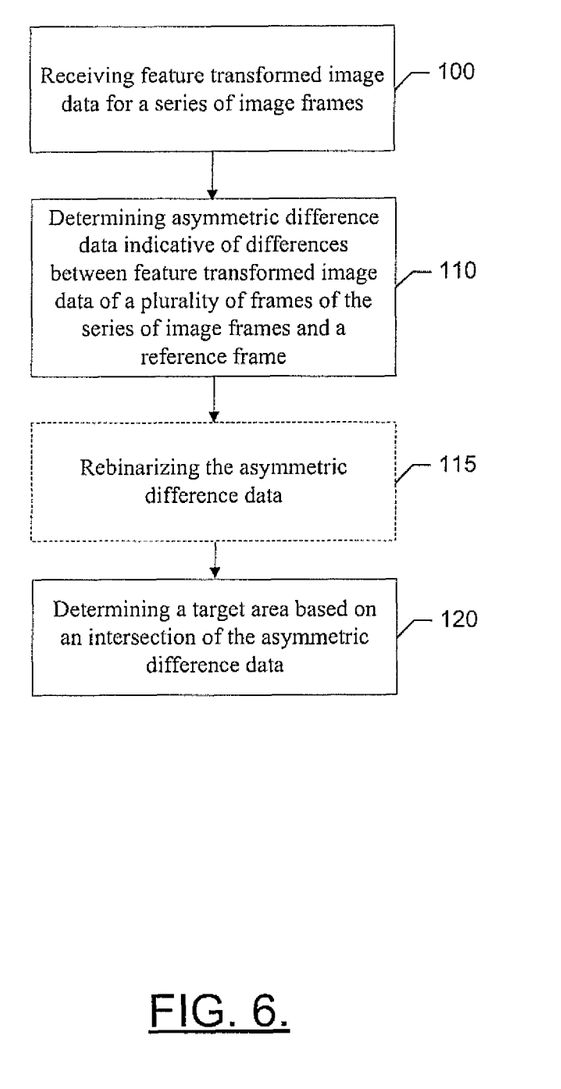
FIG. 6 is a flowchart according to an exemplary method for providing hand detection according to an example embodiment of the present invention.

FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal or network device and executed by a processor in the user terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may include receiving feature transformed image data for a series of image frames at operation 100, determining asymmetric difference data indicative of differences between feature transformed image data of a plurality of frames of the series of image frames and a reference frame at operation 110, and determining a target area based on an intersection of the asymmetric difference data at operation 120.

In some embodiments, certain ones of the operations above may be modified or further amplified as described below. Moreover, in some embodiments additional optional operations may also be included (an example of which is shown in dashed lines in FIG. 6). It should be appreciated that each of the modifications, optional additions or amplifications below may be included with the operations above either alone or in combination with any others among the features described herein. In some embodiments, the method may include rebinarizing the asymmetric difference data at operation 115. In some cases, determining the target area comprises determining the target area based on an intersection of rebinarized asymmetric difference data. In an example embodiment, rebinarizing the asymmetric difference data comprises conducting rebinarizing using local adaptive thresholding. In some embodiments, receiving feature transformed image data may include receiving data transformed using a local binary pattern (LBP) operator. In an example embodiment, determining asymmetric difference data may include determining differences between feature transformed image data of sequential ones of the plurality of frames and a current frame. In some cases, receiving feature transformed image data may include receiving data indicating a location of a hand in the plurality of frames. In some examples, determining the target area may include determining an area in which movement of an object occurs in the plurality of frames.

In an example embodiment, an apparatus for performing the method of FIG. 6 above may comprise a processor (e.g., the processor 70) configured to perform some or each of the operations (100-120) described above. The processor may, for example, be configured to perform the operations (100-120) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-120 may comprise, for example, the feature difference analyzer 80. Additionally or alternatively, at least by virtue of the fact that the processor 70 may be configured to control or even be embodied as the feature difference analyzer 80, the processor 70 and/or a device or circuitry for executing instructions or executing an algorithm for processing information as described above may also form example means for performing operations 100-120.

In some cases, the operations (100-120) described above, along with any of the modifications may be implemented in a method that involves facilitating access to at least one interface to allow access to at least one service via at least one network. In such cases, the at least one service may be said to perform at least operations 100 to 120.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving feature transformed image data for a series of image frames;
   determining asymmetric difference data indicative of differences between feature transformed image data of a plurality of frames of the series of image frames and a reference frame; and
   determining a target area based on an intersection of the asymmetric difference data.

2. The method of claim 1, wherein receiving feature transformed image data comprises receiving data transformed using a local binary pattern (LBP) operator.

3. The method of claim 1, wherein determining asymmetric difference data comprises determining differences between feature transformed image data of sequential ones of the plurality of frames and a current frame.

4. The method of claim 1, further comprising rebinarizing the asymmetric difference data.

5. The method of claim 1, wherein determining the target area comprises determining the target area based on an intersection of rebinarized asymmetric difference data.

6. The method of claim 1, wherein rebinarizing the asymmetric difference data comprises conducting rebinarizing using local adaptive thresholding.

7. The method of claim 1, wherein receiving feature transformed image data comprises receiving data indicating a location of a hand in the plurality of frames.

8. The method of claim 1, wherein determining the target area comprises determining an area in which movement of an object occurs in the plurality of frames.

9. An apparatus comprising at least one processor and at least one memory including computer program code, the at least one memory and the computer program code configured to, with the at least one processor, cause the apparatus at least to:
   receive feature transformed image data for a series of image frames;
   determine asymmetric difference data indicative of differences between feature transformed image data of a plurality of frames of the series of image frames and a reference frame; and
   determine a target area based on an intersection of the asymmetric difference data.

10. The apparatus of claim 9, wherein the at least one memory and computer program code are configured to, with the at least one processor, cause the apparatus to receive feature transformed image data by receiving data transformed using a local binary pattern (LBP) operator.

11. The apparatus of claim 9, wherein the at least one memory and computer program code are configured to, with the at least one processor, cause the apparatus to determine asymmetric difference data by determining differences between feature transformed image data of sequential ones of the plurality of frames and a current frame.

12. The apparatus of claim 9, wherein the at least one memory and computer program code are further configured to, with the at least one processor, cause the apparatus to rebinarize the asymmetric difference data.

13. The apparatus of claim 9, wherein the at least one memory and computer program code are configured to, with the at least one processor, cause the apparatus to determine the target area by determining the target area based on an intersection of rebinarized asymmetric difference data.

14. The apparatus of claim 9, wherein the at least one memory and computer program code are configured to, with the at least one processor, cause the apparatus to rebinarize the asymmetric difference data by conducting rebinarizing using local adaptive thresholding.

15. The apparatus of claim 9, wherein the at least one memory and computer program code are configured to, with the at least one processor, cause the apparatus to receive feature transformed image data by receiving data indicating a location of a hand in the plurality of frames.

16. The apparatus of claim 9, wherein the at least one memory and computer program code are configured to, with the at least one processor, cause the apparatus to determine the target area by determining an area in which movement of an object occurs in the plurality of frames.

17. The apparatus of claim 9, wherein the apparatus is a mobile terminal and further comprises user interface circuitry configured to facilitate user control of at least some functions of the mobile terminal.

18. A computer program product comprising at least one computer-readable storage medium having computer-executable program code instructions stored therein, the computer-executable program code instructions including program code instructions that when executed at least cause an apparatus to:
receive feature transformed image data for a series of image frames;
determine asymmetric difference data indicative of differences between feature transformed image data of a plurality of frames of the series of image frames and a reference frame; and
determine a target area based on an intersection of the asymmetric difference data.

19. The computer program product of claim 18, further comprising program code instructions for rebinarizing the asymmetric difference data.

20. The computer program product of claim 18, wherein program code instructions for determining the target area include instructions for determining the target area based on an intersection of rebinarized asymmetric difference data.

* * * * *